(12) United States Patent
Macias Horta et al.

(10) Patent No.: US 7,273,599 B2
(45) Date of Patent: Sep. 25, 2007

(54) METHOD FOR DECOLORING SULFURIC ACID

(75) Inventors: José Antonio Macias Horta, Coahuila (MX); Mauro Medina Herrera, Coahuila (MX); Saul Aviña Vielma, Coahuila (MX); Jesús Ariel Gonzalez Ramirez, Guadalupe (MX)

(73) Assignee: Servicios Industriales Penoles S.A. de C.V., Monterrey, N.L. (MX)

( * ) Notice: Subject to any disclaimer, the term of this patent is extended or adjusted under 35 U.S.C. 154(b) by 0 days.

(21) Appl. No.: 11/408,180

(22) Filed: Apr. 21, 2006

(65) Prior Publication Data

US 2006/0280674 A1 Dec. 14, 2006

(30) Foreign Application Priority Data

Apr. 22, 2005 (MX) .................. NL/a/2005/000035

(51) Int. Cl.
*C01B 17/90* (2006.01)

(52) U.S. Cl. ...................................... 423/522; 423/531
(58) Field of Classification Search ................ 423/522, 423/531
See application file for complete search history.

(56) References Cited

U.S. PATENT DOCUMENTS

| 3,856,673 A | * | 12/1974 | De La Mater et al. ..... 210/750 |
| 4,085,016 A | * | 4/1978 | Janjua et al. ................ 205/472 |
| 4,257,986 A | * | 3/1981 | Milligan et al. ............ 568/934 |

* cited by examiner

*Primary Examiner*—Timothy C. Vanoy
(74) *Attorney, Agent, or Firm*—Young & Thompson

(57) ABSTRACT

A method for decoloring sulfuric acid containing organic reatives by which it is possible to obtain a crystalline sulfuric acid having a color index of less that 30 APHA unities, by adding controlled amounts of potassium chlorate and hydrogen peroxide in a controlled environment.

9 Claims, No Drawings

METHOD FOR DECOLORING SULFURIC ACID

BACKGROUND OF THE INVENTION

A. Field of the Invention

The present invention is related to methods for decoloring sulfuric acid, and more particularly to a method for decoloring sulfuric acid having an organic reactive content by adding controlled amounts of potassium chlorate and hydrogen peroxide in a controlled environment.

B. Description of the Related Art

Normally, the sulfurous zinc concentrates used for generating $SO_2$ for the production of concentrated sulfuric acid, are obtained in mines by flotation techniques. The sulfuric acid obtained contains organic reactives at the surface of the zinc sulfide particles.

The zinc concentrates are the main raw material of the metallic zinc production plants. The organic material contained in the zinc concentrates are partially burned at the roasting step at the zinc production plant, and the non burned fraction is distilled and dragged by the $SO_2$ current to the plant where the $SO_2$ is converted to $H_2SO_4$. The acid takes the organic material which gives the acid a yellow color.

The process for converting said $SO_2$ into sulfuric acid comprises the steps of:

$SO_2$ into $SO_3$ conversion: the $SO_2$ produced at the roasting step is converted into $SO_3$ by reacting the $SO_2$ with air in a catalyzed reactor with vanadium pentoxide in accordance with the following reaction:

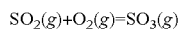

$$SO_2(g) + O_2(g) = SO_3(g)$$

Adsorption in water: finally the $SO_3$ reacts with water and $H_2SO_4$ is formed in accordance with the following reaction:

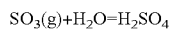

$$SO_3(g) + H_2O = H_2SO_4$$

In the roasting step, some of the organic material that was incorporated to the mineral in the concentration step at the mine, is distilled, which are dragged together with the $SO_2$ to the oxidation steps which produce small carbon particles that give a yellow color (80-100 APHA units) to the sulfuric acid when they are integrated to the same. Since the yellow color is not desirable for some of the clients, such situation created the necessity to develop a process for reducing the color of the sulfuric acid, without affecting the rest of the acid specifications which are concentration and impurity levels.

In order to decoloring sulfuric acid, there have been developed and patented various decoloring methods some of which will be described below:

U.S. Pat. No. 4,085,016 describes a method for the oxidation of organic material contained in concentrated sulfuric acid, comprising the steps of diverting a portion of a concentrated sulfuric acid stream, diluting the diverted stream with water to about 40-70% sulfuric acid concentration, passing the diluted stream through an electrolysis apparatus to oxidize some of the sulfuric acid to form a predetermined quantity of peroxosulfuric acids, and returning the diverted stream back to the main stream to oxidize the organic material and decolorize the main stream of concentrated sulfuric acid.

Japanese patent No JP58032003 describes a method for decoloring colored concentrated sulfuric acid in a short time, and to keep the acid to a required transparency without causing the clouding of the acid, by adding a proper amount of H2O2 to concentrated sulfuric acid colored with impurities under heating.

Japanese patent No. JP6219711 describes a method for denitrating and decoloring sulfuric acid comprising simultaneously adding sulfamic acid and an aqua hydrogen peroxide to the colored sulfuric acid containing NO2 or adding the sulfamic acid and subsequently the aqua hydrogen peroxide to the colored sulfuric acid.

Japanese patent JP2180704 describes a method for decoloring sulfuric acid derived from acid production methods, comprising adding hydrogen peroxide to the system at the final adsorption circuit and maintaining the circuit temperature over 70° C.

Japanese patent JP59078910 describes a process for decoloring sulfuric acid by contacting it with ozonized gaseous oxygen in a packed column structure.

Japanese patent JP60246207 claims a method for decoloring sulfuric acid by contacting an oxygen gas having a high specific concentration of oxygen with the colored sulfuric acid.

The method of the present invention achieves a high oxidant potential thus obtaining a crystalline sulfuric acid having a color index of les that 30 APHA unities.

SUMMARY OF THE INVENTION

It is therefore a main object of the present invention to provide a method for decoloring sulfuric acid having an organic reactive content by which is possible to obtain a crystalline sulfuric acid by adding controlled amounts potassium chlorate and hydrogen peroxide in a controlled environment.

It is an additional main object of the present invention to provide a method of the above disclosed nature which achieves a high oxidant potential.

It is an additional object of the present invention to provide a method of the above disclosed nature, by which it is possible to obtain a sulfuric acid having a color index of less than 30 APHA units.

These and other objects and advantages of the method for decoloring sulfuric acid of the present invention will become apparent to those persons having an ordinary skill in the art, from the following detailed description of the embodiments of the invention which will be made with reference to the accompanying drawings.

DETAILED DESCRIPTION OF THE INVENTION

The method for decoloring sulfuric acid containing organic reactive will now be described making reference to a preferred embodiment thereof, wherein the electrochemical indexes shown were measured using a platinum electrode referred to a calomel saturated electrode, wherein the method of the present invention comprising:

feeding the concentrated sulfuric acid having a color index of from 80 to 110 APHA unities to a reactor and heating it at a temperature of between about 40 to 60° C., preferably at 40° C. At these conditions the acid has an oxidant potential of 600+/−100 mV.

adding potassium chlorate at a proportion of from 10 to 50 g per acid ton in order to eliminate organic matter by oxidation.

stirring the acid in order to propitiate de dissolution of the potassium chlorate during a time of at least 60 seconds, by which the acid obtains a brighter yellow color ant the oxidant potential rises to 800 mV.

adding hydrogen peroxide at a 50% concentration in a proportion of 25 to 80 ml per acid ton in order to increase the oxidation of the organic matter and carrying out the following reactions:

$$KClO_3 + 3C \rightarrow KCl + 3CO(g) \Delta H = -90.5 \text{ kcal/mol}$$

$$2H_2SO_4 + H_2O_2 \rightarrow H_2S_2O_8 + 2H_2O \; H_2O \; \Delta H = -28.27 \text{ kcal/mol}$$

$$2H_2S_2O_8(ia) + C + 2H_2O \rightarrow 4H_2SO_4 + CO_2(g) \Delta H = -84.48 \text{ kcal/mol}$$

---

| | |
|---|---|
| $KClO_3 + 3C \rightarrow KCl + 3CO(g)$ | $\Delta H = -90.5$ kcal/mol |
| $2H_2SO_4 + H_2O_2 \rightarrow H_2S_2O_8 + 2H_2O$ | $\Delta H = -28.27$ kcal/mol |
| $2H_2S_2O_8(ia) + C + 2H_2O \rightarrow 4H_2SO_4 + CO_2(g)$ | $\Delta H = -84.48$ kcal/mol | stir the acid in order to favour a quick dissolution of the hydrogen peroxide during a time of at least 60 seconds, by which the acid oxidation potential is increased to almost 1200 mV.

settling the acid during a time of approximately 24 hours, until the potential decrease to approximately 700 mv and the color index is inferior to 30 APHA unities.

Although the potassium chlorate is firstly added, it really reacts quickly destroying organic matter until it combines with the oxygen peroxide.

Its convenient to use the potassium chlorate and hydrogen peroxide oxidants since they do not incorporate impurities to the sulfuric acid to be treated.

Finally it must be understood that the method for decoloring sulfuric acid, of the present invention, is not limited exclusively to the embodiments above described and illustrated and that the persons having ordinary skill in the art can, with the teaching provided by the invention, to make modifications to the method for decoloring sulfuric acid of the present invention, which will clearly be within of the true inventive concept and of the scope of the invention which is claimed in the following claims.

We claim:

1. A method for decoloring concentrated sulfuric acid containing organic matter comprising the steps of:
   a) feeding the concentrated sulfuric acid containing organic matter to a reactor and heating it at a temperature of from 40° C. to 60° C.;
   b) adding potassium chlorate at a proportion of from 10 to 50 g per acid ton;
   c) stirring the sulfuric acid mixed with potassium chlorate in order to favour the dissolution of the potassium chlorate;
   d) adding hydrogen peroxide at a 50% concentration at a proportion of from 25 to 80 ml per acid ton;
   e) stirring the acid containing potassium chlorate and hydrogen peroxide in order to favour a dispersion of the hydrogen peroxide;
   f) settling the acid during sufficient time until the acid obtains a redox potential of 700 mV and a color index of less than 30 APHA unities.

2. A method for decoloring sulfuric acid containing organic matter as claimed in claim 1, wherein in the step a) the sulfuric acid color index is of between 80 to 110 APRA unities.

3. A method for decoloring sulfuric acid containing organic matter as claimed in claim 1, wherein in the step a) the reactor is heated at a temperature of 40° C.

4. A method for decoloring sulfuric acid containing organic matter as claimed in claim 1, wherein in the step a), the sulfuric acid has an oxidant potential of 600+/−100 mV.

5. A method for decoloring sulfuric acid containing organic matter as claimed in claim 1, wherein in the step c) the sulfuric acid mixed with potassium chlorate is stirred during at least 60 seconds.

6. A method for decoloring sulfuric acid containing organic matter as claimed in claim 1, wherein in the step c) the oxidant potential of the sulfuric acid mixed with potassium chlorate is increased to 800 mV.

7. A method for decoloring sulfuric acid containing organic matter as claimed in claim 1, wherein in the step e) the acid containing potassium chlorate and hydrogen peroxide is stirred during a time of at least 60 seconds.

8. A method for decoloring sulfuric acid containing organic matter as claimed in claim 1, wherein in the step e) the oxidant potential of the acid containing potassium chlorate and hydrogen peroxide is increased to 1200 mV.

9. A method for decoloring sulfuric acid containing organic matter as claimed in claim 1, wherein in the step f), the acid is settled for 24 hours.

\* \* \* \* \*